US012749170B2

(12) United States Patent
Park

(10) Patent No.: US 12,749,170 B2
(45) Date of Patent: Sep. 29, 2026

(54) METHOD AND DEVICE FOR LEARNING DEPTH ESTIMATION BASED ON VIEW SYNTHESIS

(71) Applicants: Hyundai Motor Company, Seoul (KR); Kia Corporation, Seoul (KR)

(72) Inventor: Jin Ho Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 101 days.

(21) Appl. No.: 18/966,055

(22) Filed: Dec. 2, 2024

(65) Prior Publication Data

US 2025/0348986 A1 Nov. 13, 2025

(30) Foreign Application Priority Data

May 13, 2024 (KR) ........................ 10-2024-0062608

(51) Int. Cl.

| | |
|---|---|
| ***G06T 7/00*** | (2017.01) |
| ***B60W 50/06*** | (2006.01) |
| ***B60W 60/00*** | (2020.01) |
| ***G06T 5/80*** | (2024.01) |
| ***G06T 11/00*** | (2006.01) |

(52) U.S. Cl.

CPC ........... *G06T 7/0002* (2013.01); *B60W 50/06* (2013.01); *B60W 60/001* (2020.02); *G06T 5/80* (2024.01); *G06T 11/00* (2013.01); *G06T 2207/10016* (2013.01); *G06T 2207/20081* (2013.01); *G06T 2207/20084* (2013.01)

(58) Field of Classification Search

CPC ......... G06T 7/0002; G06T 5/80; G06T 11/00; G06T 2207/10016; G06T 2207/20081; G06T 2207/20084; G06T 7/50; G06T 5/60; G06T 5/50; B60W 50/06; B60W 60/001; G06N 3/047; G06N 3/084; G06N 3/045; G06N 3/0475; G06N 3/0895; G06N 3/094

See application file for complete search history.

(56) References Cited

U.S. PATENT DOCUMENTS

| | | | | |
|---|---|---|---|---|
| 2021/0004976 | A1* | 1/2021 | Guizilini | G06N 20/00 |
| 2021/0125036 | A1* | 4/2021 | Tremblay | G06V 10/242 |
| 2021/0229680 | A1 | 7/2021 | Chakravarty et al. | |
| 2021/0279869 | A1 | 9/2021 | Soni et al. | |
| 2022/0012916 | A1 | 1/2022 | Srinivasan | |
| 2022/0284624 | A1* | 9/2022 | Nimmagadda | G06V 20/10 |
| 2022/0292351 | A1* | 9/2022 | Etemad | G06T 7/50 |

(Continued)

*Primary Examiner* — Sarah Lhymn
(74) *Attorney, Agent, or Firm* — Banner & Witcoff, Ltd.

(57) ABSTRACT

A method for controlling autonomous driving of a vehicle is introduced. The method may comprise, training, based on an inference depth and an inference pose, a synthetic image model for generating a synthetic image, generating, based on the synthetic image, a first virtual image to be associated with the original image, generating, based on the original image, a second virtual image, training a generative adversarial network (GAN) for determining, based on the original image, authenticity of the first virtual image and the second virtual image, training, based on the trained GAN, a depth network, wherein the trained GAN outputs a determination of the authenticity of the first virtual image, outputting, based on the trained depth network, signal, and controlling, based on the signal, autonomous driving of the vehicle.

20 Claims, 6 Drawing Sheets

(56) References Cited

U.S. PATENT DOCUMENTS

| | | | | |
|---|---|---|---|---|
| 2023/0150429 | A1* | 5/2023 | Slutsky | B60R 1/24<br>345/419 |
| 2024/0169662 | A1* | 5/2024 | Sajjadi | G06T 15/205 |
| 2024/0338878 | A1* | 10/2024 | Kwak | G06T 11/10 |
| 2024/0371015 | A1* | 11/2024 | Ansari | G06N 3/045 |
| 2024/0412493 | A1* | 12/2024 | Garrepalli | G06V 10/82 |
| 2024/0428500 | A1* | 12/2024 | Shah | G06T 17/005 |
| 2025/0104290 | A1* | 3/2025 | Ding | G06V 10/44 |
| 2025/0232471 | A1* | 7/2025 | Zhou | G06T 7/75 |

* cited by examiner

METHOD AND DEVICE FOR LEARNING DEPTH ESTIMATION BASED ON VIEW SYNTHESIS

CROSS REFERENCE TO RELATED APPLICATION

The present application claims the benefit of priority to Korean provisional Patent Application No 10-2024-0062608, filed in the Korean Intellectual Property Office on May 15, 2024, the entire contents of which is incorporated herein for all purposes by reference.

TECHNICAL FIELD

The present disclosure relates to a method and device for learning depth estimation based on view synthesis, and more specifically, to a method and device for learning depth estimation for removing distortion of a synthetic image.

BACKGROUND

The matters described in this Background section are only for enhancement of understanding of the background of the disclosure, and should not be taken as acknowledgment that they correspond to prior art already known to those skilled in the art.

Vehicles are commercialized with autonomous driving functions for driving convenience. Autonomous driving functions are being developed so that the vehicle may control driving control as much as possible without driver intervention. Autonomous driving may process perception that detects the surrounding environment and estimates the vehicle's location, determination that determines driving behavior based on the recognized environment and estimated location, and control of actuators according to the determined behavior.

The surrounding environment may be recognized from sensor data mounted on the vehicle, such as an image, and this image may be used to estimate object detection information, semantic segmentation information, and depth information using computer vision technology. Among the information estimated by computer vision, depth information may be used for recognizing various spatial information in the autonomous driving field.

Depth information may be estimated by deep learning-based supervised learning, and supervised learning for depth estimation requires a large number of GT depth maps to secure performance, which may cause a large cost for network learning. In order to reduce the cost consumed by network learning to infer depth information, self-supervised depth estimation methods that may be learned with an image sequence or stereo image pair are considered.

The above method may use a depth model and a pose model learned to infer depth and pose based on an image acquired from a sensor, and generates a synthetic image based on the inferred depth and inferred pose. The depth model may be learned together with the pose model using a loss function based on a difference between the acquired image and the synthetic image. However, since the loss function utilized in the above method may be applied by reflecting human experience and knowledge, there may be limitations in learning high-quality image synthesis. Although the above method shows seemingly good results on the depth map output from the depth model, a synthetic image may frequently be generated with a distorted shape.

However, the convergence of the model according to the self-supervised depth estimation method may not be easy. Although a CRF (Conditional Random Field) or RNN (Recurrent Neural Network)-based method may be additionally or alternatively utilized in the above method, this may cause the disadvantage of drastically increasing an inference time and memory usage.

SUMMARY

According to the present disclosure, a method performed by an apparatus for controlling autonomous driving of a vehicle, the method may comprise, training, based on an inference depth and an inference pose, a synthetic image model for generating a synthetic image, wherein the inference depth is outputted by a depth network from an original image, and wherein the inference pose is based on the original image, generating, based on the synthetic image, a first virtual image to be associated with the original image, wherein a value indicating similarity between the first virtual image and the original image satisfies a threshold value, generating, based on the original image, a second virtual image, training a generative adversarial network (GAN) for determining, based on the original image, authenticity of the first virtual image and the second virtual image, training, based on the trained GAN, the depth network, wherein the trained GAN outputs a determination of the authenticity of the first virtual image, outputting, based on the trained depth network, signal, and controlling, based on the signal, autonomous driving of the vehicle.

The method, wherein the training the GAN may comprise training the GAN by freezing synthetic parameters, wherein the synthetic parameters are derived from training of the synthetic image model, and wherein the synthetic image model may comprise parameters learned from the depth network.

The method, wherein the GAN is trained based on a first loss function and a second loss function, wherein the first loss function is a loss function for ensuring consistency between the first virtual image and the second virtual image, and wherein the second loss function is a loss function applied to establish a determination of the authenticity of the first virtual image and the second virtual image.

The method, wherein the generating the first virtual image may comprise generating, based on the synthetic image, the first virtual image, wherein the synthetic image is based on augmentation of the inference depth.

The method, may further comprise, correcting, based on the first virtual image, a distortion of the synthetic image, and matching, based on the correcting the distortion, the synthetic image to the original image.

The method, may further comprise, training a generator to, extract features from the original image and the synthetic image, and generate, based on the extracted features, the first virtual image and the second virtual image, wherein the first virtual image and the second virtual image approximate the original image, and wherein the generating the first virtual image and the second virtual image may comprise generating, by the generator, the first virtual image and the second virtual image.

The method, wherein the training the depth network may comprise freezing parameters of a pose network, wherein the pose network outputs the inference pose and adversarial parameters of the trained GAN.

The method, wherein the training the depth network is based on a loss function utilized in the GAN, wherein the loss function may comprise a first loss function and a second loss function, wherein the first loss function is a loss function utilized in the training of the GAN to ensure consistency between the first virtual image and the second virtual image, and wherein the second loss function is a loss function applied in the training of the GAN to establish a determination of the authenticity of the first virtual image and the second virtual image.

The method, wherein the training the depth network is based on a first loss function and a second loss function, wherein the first loss function is a triplet loss function among the synthetic image and the first virtual image and the second virtual image, wherein the synthetic image is generated and stored by the trained synthetic image model, and wherein the first virtual image and the second virtual image are generated by the trained GAN, and wherein the second loss function is a loss function applied in the training of the GAN to establish a determination of the authenticity of the first virtual image and the second virtual image.

The method, wherein the synthetic image model is a view synthesis based self-supervised depth estimation model, wherein the original image is in the view synthesis based self-supervised depth estimation model, wherein the original image may comprise a source image and a target image that is time-series related to the source image, wherein the inference depth is generated based on the source image, the inference pose is generated based on the source image and the target image, and the synthetic image is outputted based on the inference depth, the inference pose, and the source image, and wherein the view synthesis based self-supervised depth estimation model is trained based on approximating the synthetic image to the target image.

According to the present disclosure, an apparatus for controlling autonomous driving of a vehicle, the apparatus may comprise, a processor, and a memory configured to store at least one instruction, that when executed by the processor, is configured to cause the apparatus to, train, based on an inference depth and an inference pose, a synthetic image model for generating a synthetic image, wherein the inference depth is outputted by a depth network from an original image, and wherein the inference pose is based on the original image, generate, based on the synthetic image, a first virtual image to be associated with the original image, wherein a value indicating similarity between the first virtual image and the original image satisfies a threshold value, and generate, based on the original image, a second virtual image, train a generative adversarial network (GAN) for determining, based on the original image, authenticity of the first virtual image and the second virtual image, and train, based on the trained GAN, the depth network, wherein the trained GAN is configured to output a determination of the authenticity of the first virtual image, output, based on the trained depth network, a signal, and control, based on the signal, autonomous driving of the vehicle.

The apparatus, wherein the at least one instruction, when executed by the processor, is configured to cause the apparatus to train the GAN by freezing synthetic parameters, wherein the synthetic parameters are derived from training of the synthetic image model, and wherein the synthetic image model may comprise parameters learned from the depth network.

The apparatus, wherein the GAN is trained based on a first loss function and a second loss function, wherein the first loss function is a loss function for ensuring consistency between the first virtual image and the second virtual image, and wherein the second loss function is a loss function applied to establish a determination of the authenticity for the first virtual image and the second virtual image.

The apparatus, wherein the at least one instruction, when executed by the processor, is configured to cause the apparatus to generate, based on the synthetic image, the first virtual image, wherein the synthetic image is based on augmentation of the inference depth.

The apparatus, wherein the at least one instruction, when executed by the processor, is configured to cause the apparatus to, correct, based on the first virtual image, a distortion of the synthetic image, and match, based on the distortion corrected, the synthetic image to the original image.

The apparatus, wherein the first virtual image and the second virtual image are generated by a generator, and wherein the at least one instruction, when executed by the processor, is configured to cause the apparatus to, train the generator to, extract features from the original image, and generate, based on the extracted features, the first virtual image and the second virtual image, wherein that the first virtual image and the second virtual image approximate the original image.

The apparatus, wherein the at least one instruction, when executed by the processor, is configured to cause the apparatus to train the depth network by freezing parameters of a pose network, wherein the pose network is configured to output the inference pose and adversarial parameters of the trained GAN.

The apparatus, wherein the at least one instruction, when executed by the processor, is configured to cause the apparatus to train, based on a loss function utilized in the GAN, the depth network, wherein the loss function may comprise a first loss function and a second loss function, and wherein the first loss function is a loss function utilized in the training of the GAN to ensure consistency between the first virtual image and the second virtual image, and wherein the second loss function is a loss function applied in the training of the GAN to establish a determination of the authenticity of the first virtual image and the second virtual image.

The apparatus, wherein the at least one instruction, when executed by the processor, is configured to cause the apparatus to train, based on a first loss function and a second loss function, the depth network, wherein the first loss function is a triplet loss function among the synthetic image and the first virtual image and the second virtual image, wherein the second loss function is a loss function applied in the training of the GAN to establish a determination of the authenticity of the first virtual image and the second virtual image.

The apparatus, wherein the synthetic image model is a view synthesis based self-supervised depth estimation model, wherein the original image is in the view synthesis based self-supervised depth estimation model, wherein the original image may comprise a source image and a target image that is time-series related to the source image, wherein the inference depth is generated based on the source image, the inference pose is generated based on the source image and the target image, and the synthetic image is outputted based on the inference depth, the inference pose, and the source image, and wherein the view synthesis based self-supervised depth estimation model is trained based on approximating the synthetic image to the target image.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Specifically, for purposes of this application and the claims, using the exemplary phrase “at least one of: A; B; or C” or “at least one of A, B, or C,” the phrase means “at least one A, or at least one B, or at least one C, or any combination of at least one A, at least one B, and at least one C. Further, exemplary phrases, such as “A, B, and C”, “A, B, or C”, “at least one of A, B, and C”, “at least one of A, B, or C”, etc. as used herein may mean each listed item or all possible combinations of the listed items. For example, “at least one of A or B” may refer to (1) at least one A; (2) at least one B; or (3) at least one A and at least one B.

Figure 1:
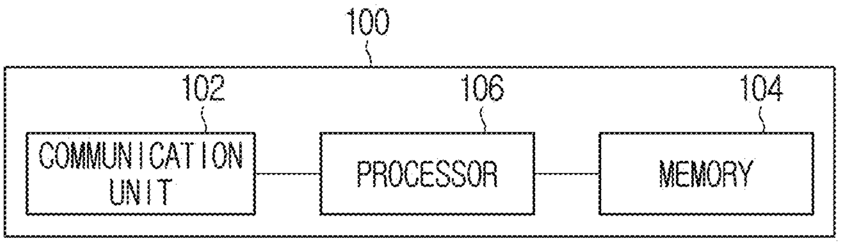
FIG. 1 shows an example of modules that constitute a learning device according to an example of the present disclosure.

Hereinafter, a learning device implementing a method of learning depth estimation based on view synthesis according to an example of the present disclosure will be described with reference to FIGS. 1 and 2. FIG. 1 shows an example of modules constituting a learning device according to an example of the present disclosure.

Referring to FIG. 1, a learning device 100 may learn a depth network using a synthetic image model including the depth network and a pose network, and an additional model associated with the synthetic image model to improve the performance of the depth network in the model. The depth network may be referred to in various ways, for example, as a depth model, a depth estimation model, a learning model of depth information, etc. The additional model may be, for example, a generative adversarial network (GAN). In the present disclosure, a generative adversarial network may be described interchangeably with a GAN for convenience of description. The depth network may be a neural network designed to estimate depth information from a sequence of images. In the context of autonomous driving, the depth network may interpret distances to various elements in the environment. The depth network may be integral to creating a depth map, which may provide 3D spatial information by estimating how far objects are from the camera. The depth network may learn depth estimations from sequences of images without labeled depth data.

The pose network may be responsible for determining the relative position and orientation (pose) of a sensor (e.g., a camera) or vehicle between frames. The pose network may work in conjunction with the depth network. The pose network may process pairs of images to infer the camera’s movement. The pose estimation may be refined by using dynamic regions, which help to distinguish moving objects from static ones, thus improving the accuracy of a learning apparatus (e.g., learning device 100).

The synthetic image model may a component of a system that uses both the depth and pose networks to generate synthetic images. Synthetic images may be created by transforming the inferred depth and pose data into visual representations, simulating new viewpoints or perspectives. The synthetic images may be generated based on the synthetic image model. These images may represent a new viewpoint of a scene that a vehicle may potentially encounter. The synthetic images may provide training feedback, enabling the network to refine its depth and pose estimations, thus improving the accuracy and reliability of autonomous driving decisions.

Specifically, the learning device 100 may primarily train the depth network by training the synthetic image model that generates a synthetic image from an original image constituting learning data using the depth network and the pose network. In addition or alternative, the learning device 100 may be a device that trains an additional model, i.e., a generative adversarial network (GAN) and secondarily trains the depth network included in the synthetic image model using the trained additional model, to remove distortion of the synthetic image and output a high-quality synthetic image. The learning device 100 distributes the depth network that contributes to outputting a high-quality image to a mobility device (see 200 of FIG. 6), so that the mobility device 200 may utilize the distributed depth network for driving control.

The mobility device 200 may refer to a device that may move to a specific point. The mobility device 200 may be any one of devices such as a ground vehicle that runs on the ground, a mobile robot that is autonomously or remotely controlled, a work robot for a specific purpose, etc. In addition or alternative, the mobility device 200 is not limited to a ground mobility device, and may be, for example, an air mobility device, a water mobility device for water transportation, or an underwater mobility device (e.g., a submarine). The mobility device 200 may be driven autonomously or passively. The mobility device 200 which may be driven autonomously may be implemented as semi-autonomous driving or fully autonomous driving. Fully autonomous driving may be provided as autonomous movement in which a controller of the mobility device 200 completely controls control without user intervention even when a driving situation is uncertain. Semi-autonomous driving may be provided as autonomous movement that requires driver intervention depending on a specific driving situation. Semi-autonomous driving may be implemented by having the controller of the mobility device 200 deactivate autonomous driving when the above situation occurs and transfer control to the user, thereby allowing the user to perform manual driving. According to the level of autonomous driving defined by the Society of Automotive Engineers (SAE), semi-autonomous driving corresponds to autonomous driving levels 1 to 4, and fully autonomous driving corresponds to level 5.

Specifically, an automation level of an autonomous driving vehicle may be classified as follows, according to the American Society of Automotive Engineers (SAE). At autonomous driving level 0, the SAE classification standard may correspond to “no automation,” in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to “driver assistance,” in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein.

One or more features associated with autonomous driving control may be activated based on configured autonomous driving control setting(s) (e.g., based on at least one of: an autonomous driving classification, a selection of an autonomous driving level for a vehicle, etc.). Based on one or more features (e.g., features of a trained depth network) described herein, an operation of the vehicle may be controlled. The vehicle control may include various operational controls associated with the vehicle (e.g., autonomous driving control, sensor control, braking control, braking time control, acceleration control, acceleration change rate control, alarm timing control, forward collision warning time control, etc.).

One or more auxiliary devices (e.g., engine brake, exhaust brake, hydraulic retarder, electric retarder, regenerative brake, etc.) may also be controlled, for example, based on one or more features (e.g., features of a trained depth network) described herein. One or more communication devices (e.g., a modem, a network adapter, a radio transceiver, an antenna, etc., that is capable of communicating via one or more wired or wireless communication protocols, such as Ethernet, Wi-Fi, near-field communication (NFC), Bluetooth, Long-Term Evolution (LTE), 5G New Radio (NR), vehicle-to-everything (V2X), etc.) may also be controlled, for example, based on one or more features (e.g., features of a trained depth network) described herein. Minimum risk maneuver (MRM) operation(s) may also be controlled, for example, based on one or more features (e.g., features of a trained depth network) described herein. A minimal risk maneuvering operation (e.g., a minimal risk maneuver, a minimum risk maneuver) may be a maneuvering operation of a vehicle to minimize (e.g., reduce) a risk of collision with surrounding vehicles in order to reach a lowered (e.g., minimum) risk state.

A minimal risk maneuver may be an operation that may be activated during autonomous driving of the vehicle when a driver is unable to respond to a request to intervene. During the minimal risk maneuver, one or more processors of the vehicle may control a driving operation of the vehicle for a set period of time. Biased driving operation(s) may also be controlled, for example, based on one or more features (e.g., features of a trained depth network) described herein.

A driving control apparatus may perform a biased driving control. To perform a biased driving, the driving control apparatus may control the vehicle to drive in a lane by maintaining a lateral distance between the position of the center of the vehicle and the center of the lane. For example, the driving control apparatus may control the vehicle to stay in the lane but not in the center of the lane. The driving control apparatus may identify or determine a biased target lateral distance for biased driving control.

For example, a biased target lateral distance may comprise an intentionally adjusted lateral distance that a vehicle may aim to maintain from a reference point, such as the center of a lane or another vehicle, during maneuvers such as lane changes. This adjustment may be made to improve the vehicle's stability, safety, and/or performance under varying driving conditions, etc.

For example, during a lane change, the driving control system may bias the lateral distance to keep a safer gap from adjacent vehicles, considering factors such as the vehicle's speed, road conditions, and/or the presence of obstacles, etc. One or more sensors (e.g., IMU sensors, camera, LIDAR, RADAR, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, inverter, converter, motor controller, power distribution unit, high-voltage wiring and connectors, auxiliary power modules, charging interface, etc.) may also be controlled, for example, based on one or more features (e.g., features of a trained depth network) described herein.

An operation control for autonomous driving of the vehicle may include various driving control of the vehicle by the vehicle control device (e.g., acceleration, deceleration, steering control, gear shifting control, braking system control, traction control, stability control, cruise control, lane keeping assist control, collision avoidance system control, emergency brake assistance control, traffic sign recognition control, adaptive headlight control, etc.).

The learning device 100 may be, for example, a device, such as a server, provided separately from the mobility device 200, operated by a vehicle manufacturer or a management agency that provides autonomous driving services. If the learning device 100 is a server operated by a vehicle manufacturer or management agency that supports autonomous driving, it may receive connected data of the mobility device 200 or transmit data used for autonomous driving. In order to support autonomous driving and various services of the mobility device 200, the learning device 100 may transmit various information and software modules used for controlling the mobility device 200 to the mobility device 200 in response to requests and data transmitted from the mobility device 200 and a user device. In the present disclosure, the functions of the learning device 100 related to the learning method according to the example will be mainly described.

The learning device 100 may include a communication unit 102, a memory 104, and a processor 106. The communication unit 102 may support mutual communication with the mobility device 200 or 400, an ITS device 300, etc. In the present disclosure, the communication unit 102 may be a communication interface that receives various data and networks (or algorithms) used to train a learning model that supports driving and convenience functions of the mobility device 200, and transmits information and networks related to the learning model to the mobility device 200. In addition or alternative, the communication unit 102 may be a communication module that receives data generated or stored during driving from the mobility device 200, and transmits information that supports driving, such as map information, environmental information that recognizes objects around the mobility device 200, traffic information, weather information, etc. to the mobility device 200. The communication unit 102 may be a communication module that transmits applications related to driving and convenience functions.

The memory 104 may store a program and various data for controlling the learning device 100, and load a program or read and record the data according to the request of the processor 106. The memory 104 may manage a synthetic image model, a generative adversarial network provided as an additional model to retrain the depth network of the synthetic image model and learning data utilized for learning of the models. The synthetic image model and the generative adversarial network may be configured to include functional modules 110 and 120 illustrated in FIGS. 3 and 5, which will be described later. The learning data may include images collected from the plurality of mobility devices 200 and 400 and/or a DB for typical learning data, depth maps, depth information provided in a point cloud format, etc. In addition or alternative to the data described above, the memory 104 may also hold applications for implementing driving and convenience functions of the mobility device 200, map information, traffic information, weather information, and other various information affecting driving.

The processor 106 may perform overall control of the learning device 100. The processor 106 may be configured to execute applications and instructions stored in the memory 104. Specifically, the processor 106 may control the learning device 100 to train a learning model stored in the memory 104 using the learning data described above, and to distribute the trained learning model to the mobility device 200. The distributed learning model may be, for example, a depth network separated from the synthetic image model 110. The distributed model may be, for example, a depth network and a pose network. The learning model utilized for training may include a generative adversarial network 120 as an additional model, along with the synthetic image model 110.

Figure 3:
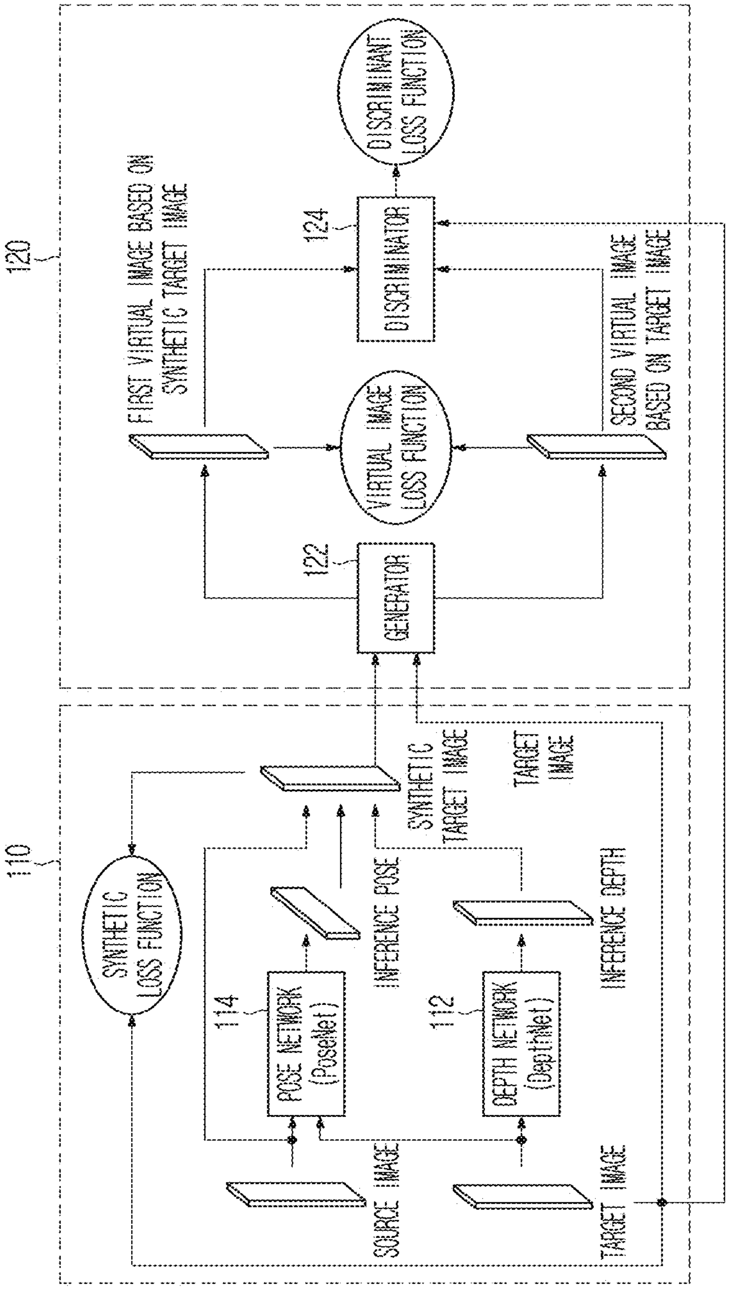
FIG. 3 shows an example of learning components used to implement a method of learning depth estimation according to another example of the present disclosure.
Figure 5:
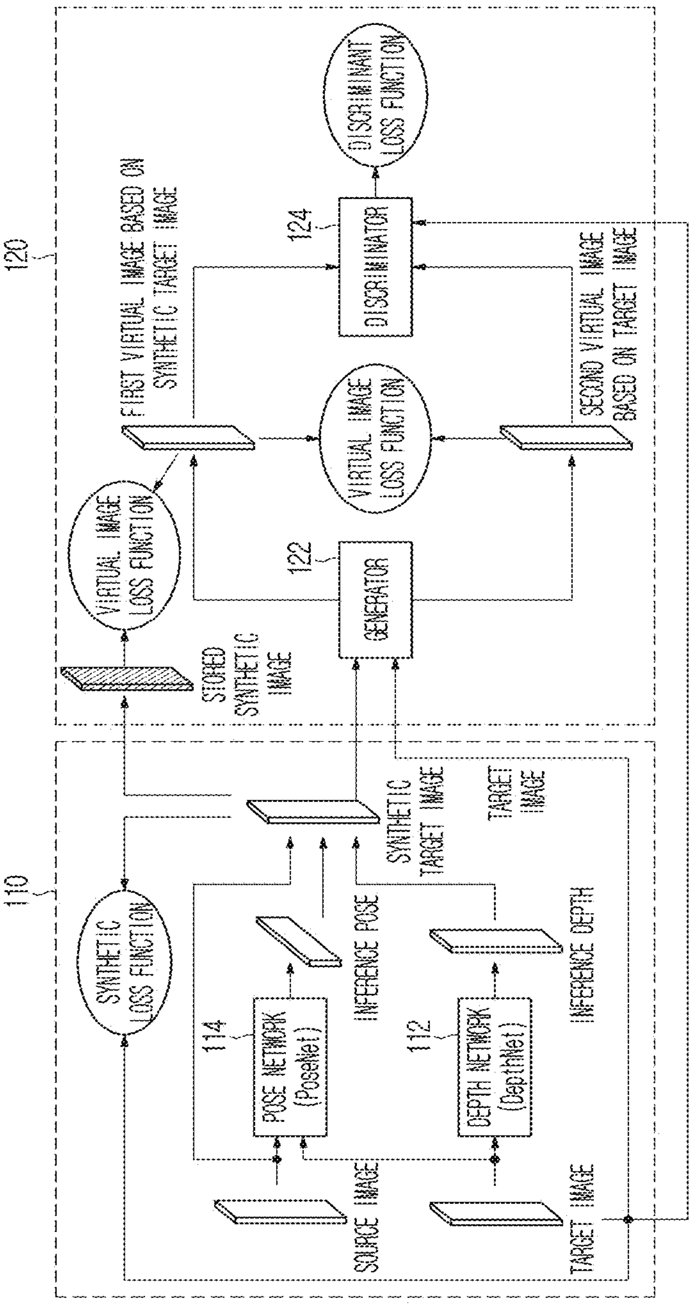
FIG. 5 shows an example of learning components used to implement a method of learning depth estimation according to another example of the present disclosure.

The processor 106 may determine learnable parameters for constructing functional modules of FIGS. 3 and 5, i.e., sub-models, that constitute the learning model, through training. In addition or alternative, the processor 106 may receive, from the mobility device 200 and 400, the learning model distributed to the mobility devices 200 and 400, such as feedback information according to operation of the depth network and data similar to the learning data described above, and update the depth network based on received information and data. The processor 106 may distribute the updated depth network to the mobility devices 200 and 400. As another example, when the pose network is distributed along with the depth network, the pose network may also be updated in the learning device 100 and transmitted to the mobility devices 200 and 400.

Specifically, the processor 106 may perform a process of training the synthetic image model 110 that generates the synthetic image based on an inference depth output from an original image by the depth network (see 112 of FIG. 3 and FIG. 5) and an inference pose based on the original image. The inference depth may refer to estimated depth information produced by the depth network for a given image sequence. This depth may not be ground-truth data but may be inferred by the depth network based on the input images and prior training. Inference depth may represent the network's prediction of distances to objects, forming the foundation for further synthetic processing to enhance the depth accuracy. The inference pose may be an estimate of a sensor's position and orientation relative to other frames in the original image. The inference pose may be used as a baseline to enable a better understanding of a vehicle's movement within its environment.

The processor 106 may generate a first virtual image based on the synthetic image to be similar to the original image and a second virtual image based on the original image, and may execute a training process of the GAN 120 that determines the authenticity of at least the first virtual image using the original image. In addition or alternative, the processor 106 may perform a process of retraining the depth network 112 using the GAN 120 that has been trained to output a determination of the authenticity of the first virtual image generated from the synthetic image.

In addition or alternative, the processor 106 may perform processing for supporting driving and convenience functions of the mobility device 200. In the present disclosure, the processor 106 may be implemented as a single processing module, for example. In another example, the processing according to the above-described matters may be distributed and processed in a plurality of processing modules, and the processor 106 may be collectively referred to as a plurality of processing modules in the present disclosure.

Hereinafter, a method of learning depth estimation based on view synthesis according to another example of the present disclosure will be described in detail with reference to FIGS. 2 and 3.

Figure 2:
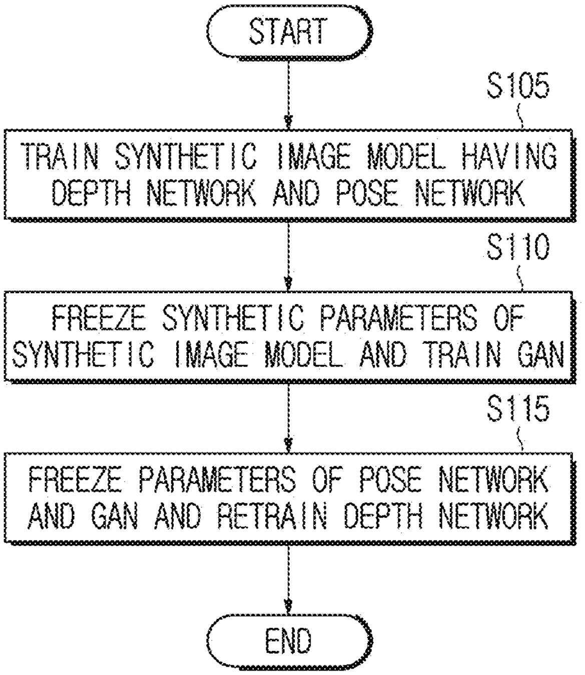
FIG. 2 shows an example of a method of learning depth estimation based on view synthesis according to an example of the present disclosure.

FIG. 2 shows an example of a method of learning depth estimation based on view synthesis according to an example of the present disclosure, and FIG. 3 shows an example of learning components used to implement a method of learning depth estimation according to another example of the present disclosure. In FIG. 3, a module implementing the learning method may be a software module processed by the processor 106, and the processor 106 may process requests from the modules listed in FIG. 3.

In the present disclosure, the learning model according to the example is mainly described as being trained only in the learning device 100, but the method of learning depth estimation described below may be distributed to and processed in the learning device 100 and other devices, as long as it does not conflict with the description below. The other devices may be, for example, other servers and/or the mobility devices 200 and 400. Hereinafter, the processor 106 of the learning device 100 may simply be described as the learning device 100 for convenience of explanation, or these terms may be used interchangeably.

For convenience, FIG. 2 is described by way of an example in which the steps are performed by a processor (e.g., processor 106 or control circuitry). One, some, or all steps of FIG. 2, or portions thereof, may be performed by one or more other circuits. One or some, steps of FIG. 2 may be omitted, performed in other orders, and/or otherwise modified, and/or one or more additional steps may be added.

Referring to FIG. 2, the processor 106 of the learning device 100 may train the synthetic image model 110 including the depth network 112 and the pose network 114, in order to primarily learn the depth network 112 (S105).

The synthetic image model 110 may be trained using a pre-provided learning data set, for example, an original image including various objects. The various objects may include dynamic objects having mobility and static objects having no mobility. The dynamic objects for autonomous driving may be, for example, various types of mobility devices 200, pedestrians, and other agents having motion. The static objects for autonomous driving may include, for example, traffic facilities including roads, road signs, traffic lights, guard rails, and road markings for traffic control. Additionally, the static objects may include buildings, structures, and other static objects along the road. The original image may be, for example, a static image acquired from a camera mounted on the mobility device 200 or another device, and/or a dynamic image (video) sequentially representing a series of movements in an object. The original image may be a preprocessed image for an image acquired from a camera. In the present disclosure, the original image may be a plurality of images provided in time series or sequentially, and some original images of the plurality of images may be source images, and other original images may be target images. For example, when the source image employs an image at a specific time, the target image may utilize an image that is related in time series to the source image. Specifically, the target image may be an image preceding or succeeding the source image in time.

The depth network 112 may be a learning model that infers depth values per pixel of an image. In the present disclosure, the depth network 112 generates inference depths per pixel of the source image, and may utilize an encoder-decoder that uses an appropriate neural network, for example, a convolutional layer and a multi-perceptron layer (MLP). The depth network 112 is not limited to the above-described examples, and may be implemented as a learning model in various ways.

The pose network 114 may be a learning model that infers a value corresponding to a translation and rotation transformation between time-series images, that is, the source image and the target image. The pose network 114 may, for example, estimate a transformation value of a pose that transforms a coordinate system of a camera that captured the target image into a coordinate system of a camera that captured the source image. The pose network 114 may include a convolutional layer that extracts features to identify changes in pose and an MPL that estimates change-related information, but is not limited thereto and may be constructed using various types of learning models.

The processor 106 may train the synthetic image model 110 having the pose network 114 together with the depth network 112 for primary learning. Specifically, the processor 106 may train the synthetic image model 110 that generates a synthetic image based on an inference depth output from a source image by the depth network 112 and an inference pose output from the source and target images by the pose network 114. The detailed elements learned in the synthetic image model 110 may be parameters of each of the depth network 112 and the pose network 114. The synthetic image model 110 is trained using a synthetic loss function that contributes to making the synthetic image similar to the target image, and from the perspective of being generated as an image similar to the target image, the synthetic image may be referred to as a synthetic target image in FIGS. 3 and 5 described below. In the present disclosure, for convenience of description, the synthetic target image and the synthetic image may be used interchangeably or the synthetic image will be focused upon.

The synthetic image model according to the above-described matters may be a view synthesis based self-supervised depth estimation model. The self-supervised depth estimation may calculate a synthetic loss function for the synthetic image by using the original image, such as the target image, input to the synthetic image model 110, without selecting and using correct data (ground truth data), i.e., a correct image, from the learning data (original image). In the present disclosure, the synthetic loss function uses at least one of, for example, a similarity-based loss function (SSIM), a regression loss function (Distance loss), or a loss function for ensuring local consistency, but is not limited thereto. The synthetic image model may be trained until the loss value calculated from the synthetic loss function converges to a predetermined value or until it reaches a minimum value.

The synthetic image model 110, whose learning is primarily completed through step S105, may generate a synthetic image from an image acquired from a camera. However, the synthetic image of the model may be output as a distorted image in which at least some objects have a different shape from the original image. In order to identify the cause of the distorted image, the output result and intermediate data of the synthetic image model 110, such as the inference depth, the synthetic image, and the point cloud from the inference depth, may be analyzed. The depth image according to the inference depth is formed to have a fairly good shape, but it is confirmed through experiments that the synthetic image generated based on the inference depth and the inference pose has distortion. This may be expected because the inference depth involved in the generation of the synthetic image includes an error or inaccuracy. The inaccuracy of the inference depth may be confirmed from the point cloud.

Although it may be assumed that the distortion of the synthetic image is caused by the inference pose, it may be expected that the distortion due to the inference pose is substantially minimal due to the following. Since the inference pose is a global transformation value between the source image and the target image, if the inference pose is inaccurate, distortion occurs in the entire synthetic image, resulting in an overall view synthesis failure. However, it may be confirmed that the distortion does not occur in the entire image as a result of the experiment. In addition or alternative, considering that the entire synthetic image is affected when the inference pose changes, the proportion of the distorted part in the synthetic image is significantly smaller than that of the undistorted part, so that modification of the pose according to the pose network 114 may have limitations in improving the quality of the synthetic image. Accordingly, the example of the present disclosure may be implemented to improve the performance of view synthesis by retraining the depth network 112 rather than the pose network 114 and correcting the inference depth.

By the above-described matters related to step S105, the depth network 112 intended by the present example may be primarily learned. In the example of the present disclosure, the generative adversarial network (GAN) 120 may be introduced for retraining the depth network 112 that has been primarily learned.

Next, the processor 106 of the learning device 100 may train the generative adversarial network 120 by freezing the parameters of the synthetic image model 110 (S110).

The generative adversarial network 120 may receive the synthetic image and the original image as input, and determine at least the authenticity of a virtual image generated from the synthetic image. The original image may be a learning data set utilized in step S105 or a learning data set different from step S105. When the learning of the generative adversarial network 120 is completed in step S110, as described below in step S115, the depth network 112 of the synthetic image model 110 may be re-learned using the learned generative adversarial network 120 and loss and data derived therefrom.

Specifically, the GAN 120 may include a generator 122 that generates a first virtual image based on the synthetic image output from the synthetic image model 110 and outputs a second virtual image based on the original image, and a discriminator 124 that determines the authenticity of the first and second virtual images using the original image. In order for the first and second virtual images to be determined to be true (or deceived to be true) by the discriminator 124, the generator may be trained to obtain (or extract) latent features (latent space or features) from the synthetic image to generate the first and second virtual images. In order for the first and second virtual images to be determined to be deceived to be true, an adversarial training process may be involved. The GAN 120 may comprise a generator, which creates virtual images, and a discriminator, which assesses their authenticity. The generator may produce a first virtual image based on synthetic output and a second one based on the original image. The discriminator 124 may evaluate these images against real images to determine their authenticity. The generator's objective is to create images so realistic that the discriminator is "deceived" into classifying them as real. This adversarial interaction may drive the generator to improve the quality of its synthetic images, making them increasingly indistinguishable from real images over time, thereby enhancing the system's overall performance.

The synthetic image may be an image inferred by inputting source and target images to the synthetic image model 110 learned in step S105. The first virtual image may be generated by receiving the synthetic image without change, for example. As another example, the first virtual image may be generated based on the synthetic image resulting from augmentation of the inference depth. According to another example, the generator 122 may include an augmentation processor that adds a change to the input synthetic image in terms of the inference depth. The augmentation processor may apply jittering to the inference depth of the synthetic image, for example, and the jittering may be a method of adding Gaussian noise. The method related to the augmentation processing is not limited to the above-described example, and various augmentation techniques may be used.

The generator 122 may be trained in conjunction with the discriminator 124 to generate the first virtual image approximately to the second virtual image and the original image and correct the distortion of the synthetic image. Here, the original image is, for example, a target image, and the original image input to the generator 122 in order to generate the second virtual image may be a target image. When generating the second virtual image, the generator 122 may not output the target image without any processing, but may execute processing to construct the second virtual image approximate to the target image based on data extracted from the target image. Specifically, the generator 122 may extract rough features from the target image, and generate the second virtual image approximate to the target image based on the extracted rough features so as to reconstruct the target image.

The generator 122 may use common learnable parameters as adversarial parameters in generating the first and second virtual images. For reconstruction of the level approximate to the target image, parameters for extracting features of the target image, such as filter parameters, need to be learned well. The well-learned filter parameters may have characteristics used for generating the first virtual image approximate to the target image and the second virtual image, i.e., excellent extraction characteristics for the synthetic image. In addition or alternative, for the reconstruction, parameters utilized for generating the virtual image based on the extracted features also need to be learned well.

Figure 4:
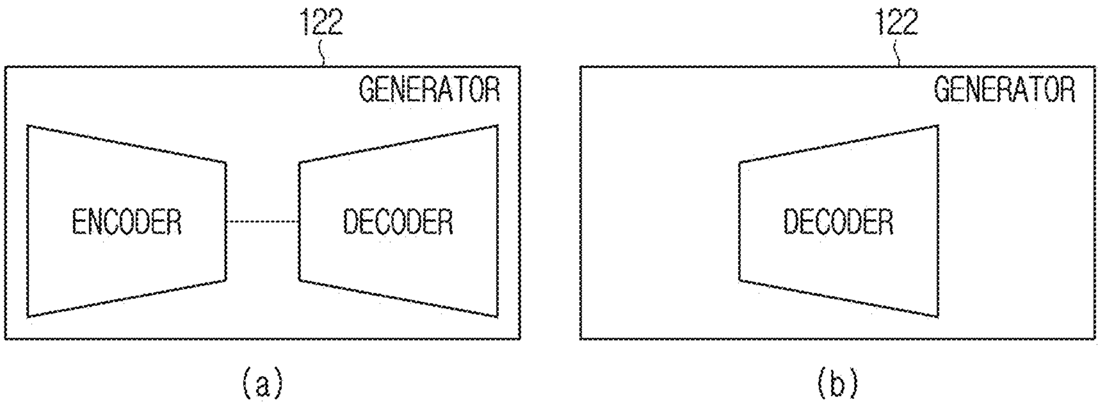
FIG. 4 shows an example of the structure of a generator.

The structure of the generator 122 will be described with reference to FIG. 4. FIG. 4 shows an example of the structure of a generator. As in (a) of FIG. 4, the generators 112 and 114 may include an encoder for extracting latent features of a synthetic image and a target image, and a decoder for generating a virtual image based on the extracted features. The encoder may be composed of a filter including learnable parameters in a convolution layer for extracting the features from the input images and a multi-perceptron layer having a weight parameter to approximate the target image, for example. The decoder may have a layer for reconstructing the virtual image with the approximated target image. Specifically, the decoder may be composed of a layer including learnable parameters for removing distortion of the synthetic image to approximate the target image, and outputting a virtual image based on the features. (b) of FIG. 4, which illustrates another example, shows the generator 122 corresponding to the case where the features are already specified in the synthetic image and the target image. The specificity of the feature may be processed, for example, by considering that the feature of the image follows a Gaussian distribution. The decoder may identify the features of the synthetic image and the target image in the above manner to output the virtual image.

The discriminator 124, for example, uses the original image to determine the authenticity of the first and second virtual images, and may be trained independently from the generator 122. Here, the original image may be, for example, a target image. The discriminator 124 may determine the authenticity of the virtual image by analyzing whether the virtual image conforms to the shape of the target image without distortion. The discriminator 124 may provide a probability that the virtual image corresponds to a true image along with the result of determining the authenticity of the virtual image. The discriminator 124 may have learnable parameters that extract features from the virtual image to determine the authenticity of the virtual image, as adversarial parameters. The discriminator 124 may include, for example, a convolutional layer and a detailed module that apply the parameters. The discriminator 124 may be trained to increase the accuracy of the authenticity determination. As another example, the discriminator 124 is configured to determine the authenticity of the first virtual image by the original image, and may be trained to increase the accuracy in determining the authenticity of the first virtual image.

Training of the GAN 120 may be processed by freezing parameters of the depth network 112 and the pose network 114 of the learned synthetic image model 110 as described above, and training the generator 122 and the discriminator 124. The GAN 120 may be trained to determine learnable adversarial parameters applied to the generator 122 and the discriminator 124.

The learning of the generator 122 in the GAN 120 may proceed with an unstable pattern in some cases. Furthermore, when the generator 122 includes the encoder and the decoder as in (a) of FIG. 4 and the synthetic image model 110 is used in parallel in the learning of the GAN 120, the distribution of the synthetic image input from the synthetic image model 110 continuously varies, so the learning of the GAN 120 may proceed unstably. Furthermore, model collapse may be caused during the learning process of the GAN 120. Considering the above points, in order to block the variability of the synthetic image input in the learning of the GAN 120 and input a constant synthetic image, the GAN 120 may be learned in a state in which the parameters of the learned depth network 112 and the learned pose network 114 are frozen. In addition or alternative, in order to ensure stable learning of the GAN 120 in the present disclosure, the GAN 120 may be trained separately from the training of the synthetic image model 110 and the retraining of the depth network 112. That is, in the present disclosure, a multi-stage training process may be used so that the model and the network proceed sequentially in steps S105 to S115.

Referring back to FIG. 2, the GAN 120 may be trained using a virtual image loss function and a discriminant loss function as losses. The virtual image loss function may be a loss function for ensuring consistency between the first and second virtual images. The virtual image loss function may use, for example, at least one of a similarity-based loss function (SSIM), a regression loss function (distance loss), or a loss function for ensuring local consistency, but is not limited thereto. The discriminant loss function may be a loss function applied to establish a determination of authenticity for the first and second virtual images using the target image. The discriminant loss function may be, for example, BCE (Binary Cross Entropy). The generator 122 and the discriminator 124 may be trained until a difference between the first and second virtual images and a difference between the virtual image and the target image enter convergence ranges set by the virtual image loss function and the discriminant loss function, respectively, or until the sum of the loss functions reaches a minimum value. Once training is complete, the learnable parameters of the generator 122 and the discriminator 124 may be determined.

Next, the processor 106 of the learning device 100 may freeze the parameters of the pose network 114 of the synthetic image model 110 and the GAN 120, and retrain the depth network 112 using the trained GAN 120 (S115).

The processor 106 may retrain the depth network 112 using the synthetic image generated from the primarily learned synthetic image model 110 and the first virtual image generated from the synthetic image by the trained GAN 120.

The synthetic image may be output by inputting original images, for example, source and target images, to the synthetic image model 110 having the primarily learned depth network 112. The original images may be a learning data set utilized in step S105 or a learning data set different from step S105. The synthetic image and the target images may be input to the generator 122 of the learned GAN 120. The generator 122 may output a first virtual image based on the synthetic image and a second virtual image based on the target image, similar to step S110. However, in the case of re-learning the depth network 112, the discriminator 124 may determine the authenticity of the first virtual image by receiving the first virtual image excluding the second virtual image, unlike step S110. The discriminator 124 may determine the authenticity of the first virtual image by analyzing whether the first virtual image is generated as an image without distortion.

In the present disclosure, since only the depth network 112 is retrained so that only the learnable parameters of the depth network 112 are adjusted, the parameters of the pose network 114 and the adversarial parameters of the trained GAN 120 may be frozen. According to the present disclosure, since the GAN 120 for retraining the depth network 112 is trained in advance according to a multi-stage training process, the model collapse phenomenon of the GAN 120 caused by the GAN 120 being trained simultaneously in the retraining of the depth network 112 may be prevented.

The depth network 112 may be retrained by using the loss function utilized in the learning of the GAN 120 in step S110. The loss function may specifically include the virtual image loss function of step S110 and the discriminant loss function of step S110. The virtual image loss function in step S115 may be a loss function based on the difference between the first and second virtual images, similar to step S110. The discriminant loss function in step S115 may provide information related to the determination of authenticity of the first virtual image using the target image. In the present disclosure, the learnable parameters of the depth network 112 are readjusted in the retraining process, and the first virtual image may be generated from the synthetic image according to the readjusted parameters. Even if the first virtual image is output by the generator 122 that approximates the synthetic image to the target image, the first virtual image may be generated without removing the distortion effect of the synthetic image caused by the readjustment of the parameters. The distortion of the synthetic image due to the retrained depth network 112 may be estimated from the first virtual image. That is, in order to minimize the distortion effect in the first virtual image, the synthetic image needs to be generated so as not to have distortion originally through retraining of the depth network 112.

The discriminant loss function may provide a loss value according to the difference between the first virtual image and the target image to the depth network 112 through backpropagation when the first virtual image is determined to be fake (the first virtual image does not approximate the target image) by the discriminator 124. The processor 106 may readjust the parameters of the depth network 112 based on the loss value in a direction to minimize the distortion of the synthetic image input to the generator 122, so that the first virtual image approximating the target image is output from the generator 122. The parameters may be readjusted until they enter a convergence range set by the discriminant loss function or reach a minimum value, and the depth network 112 may be retrained. Accordingly, the synthetic image and the first virtual image may be generated to approximate the target image without distortion.

The virtual image loss function may reinforce the retraining of the depth network 112 by the discriminant loss function. Even if the first virtual image is determined to be true (the first virtual image approximates the target image) by the discriminator 124, distortions may exist in the first virtual image and the synthetic image. Therefore, the first virtual image may further be used to approximate the second virtual image based on the target image. This may be because the second virtual image is generated by the trained generator 122 to be very approximate to the target image. The virtual image loss function may provide a loss value according to the difference between the first virtual image and the second virtual image to the depth network 112 through backpropagation. In order to output the first virtual image approximating the second virtual image from the generator 122, the processor 106 may adjust the parameters of the depth network 112 based on the loss value in a direction that substantially removes the distortion of the synthetic image input to the generator 122. The parameters may be adjusted until the virtual image loss function enters a convergence range set by the virtual image loss function. Accordingly, the synthetic image and the first virtual image may be generated to further approximate the target image.

According to the above, the depth network 112 may be retrained so that the synthetic image matches the target image without distortion. The learning device 100 transmits the retrained depth network 112 to the mobility device 200, so that the mobility device 200 may process analysis of the image acquired from the camera 204*b* and driving control, etc. by using the depth network 112. As another example, the learning device 100 may transmit the retrained depth network 112 and the pose network 114 trained in step S105 to the mobility device 200, so that the mobility device 200 may execute the above-described processing by using these networks.

Hereinafter, a method of learning depth estimation based on view synthesis according to another example of the present disclosure will be described in detail with reference to FIGS. 2 and 5. The present example performs the same or similar process as steps S105 and S110 of FIG. 2, except that step S115 may be performed by retraining of the depth network according to step S115 of FIG. 2 and using some different loss functions. The description of steps S105 and S110, which are equally applied in the present example, will be omitted, and step S115, which uses a different loss function from that in FIG. 3, will be focused upon. FIG. 5 shows an example of learning components used to implement a method of learning depth estimation according to another example of the present disclosure.

The synthetic image model 110 and the GAN 120 may be trained substantially identically to steps S105 and S110. The synthetic image generated by the synthetic image model 110, which has been trained by step S105, may be cached and stored in the memory 104. The stored synthetic image may be used in the retraining of the depth network 112 described later.

Next, the learning device 100 may freeze the parameters of the pose network 114 of the synthetic image model 110 and the GAN 120 according to step S115, and retrain the depth network 112 using the learned GAN 120.

The freezing of the parameters of the pose network 114 and GAN 120 is substantially the same or similar as in FIGS. 2 and 3.

The depth network 112 may be retrained by utilizing a virtual image loss function and a discriminant loss function, partially similar to the example of FIG. 3. However, the example of FIG. 5 may further include a contrastive loss function as a virtual image loss function, unlike FIG. 3.

The contrastive loss function may be, in one example, a triplet loss function between a cached stored synthetic image generated by the trained synthetic image model 110 and the first and second virtual image generated by the trained GAN 12. In another example, the stored synthetic image may not be the cached image in step S105, but may utilize the cached image output by the trained synthetic image model 110 in the process of performing step S115. Accordingly, the virtual image loss function according to the present example may specifically include a triplet loss function that compares the stored synthetic image and the first and second virtual images, together with the virtual image loss function of FIG. 3.

The readjustment of the parameters of the depth network 112 according to retraining may be performed so that the first virtual image is not identical to or similar to the stored synthetic image, and so that the first virtual image approximates the second virtual image. As another example, the readjustment of the depth network 112 may be processed using the target image instead of the second virtual image as an object to be approximated.

The discriminant loss function may utilize substantially the same or similar discriminant loss function as that of FIG. 3 and step S115. The discriminant loss function may provide a loss value according to the difference between the first virtual image and the target image to the depth network 112 through backpropagation when the first virtual image is determined to be fake by the discriminator 124. The processor 106 may readjust the parameters of the depth network 112 based on the loss value in a direction that minimizes the distortion of the synthetic image input to the generator 122, so that the first virtual image that approximates the target image is output from the generator 122. The parameters may be readjusted until they enter a convergence range set by the discriminant loss function or reach a minimum value, and the depth network 112 may be retrained. Accordingly, the synthetic image and the first virtual image may be generated to approximate the target image without distortion.

The virtual image loss function including the contrastive loss function may reinforce the retraining of the depth network 112 by the discriminant loss function. Even if the first virtual image is determined to be true by the discriminator 124, distortions may exist in the first virtual image and the synthetic image. Therefore, the first virtual image may be more different from the stored synthetic image and the first virtual image may approximate the second virtual image based on the target image. This may be due to the reason described in step S115. The contrastive loss function may provide the loss value according to the triplet to the depth network 112 through backpropagation. The processor 106 may adjust the parameters of the depth network 112 based on the loss value in a direction that substantially removes the distortion of the synthetic image input to the generator 122, so that the first virtual image that is different from the stored synthetic image and approximates the second virtual image is output from the generator 122. The parameters may be adjusted until they enter the convergence range set by the virtual image loss function of FIG. 3 and the contrastive loss function, or until the sum of the functions reaches a minimum value. Accordingly, the synthetic image and the first virtual image may be generated to further approximate the target image.

According to the above, the depth network 112 may be retrained so that the synthetic image matches the target image without distortion. The learning device 100 may transmit the retrained depth network 112 to the mobility device 200, or, as another example, transmit the depth network 112 together with the pose network 114 trained in step S105 to the mobility device 200.

Hereinafter, the mobility device 200 that receives the retrained depth network 112 from the learning device 100 in FIG. 2 and another device that communicates with the device will be described.

Figure 6:
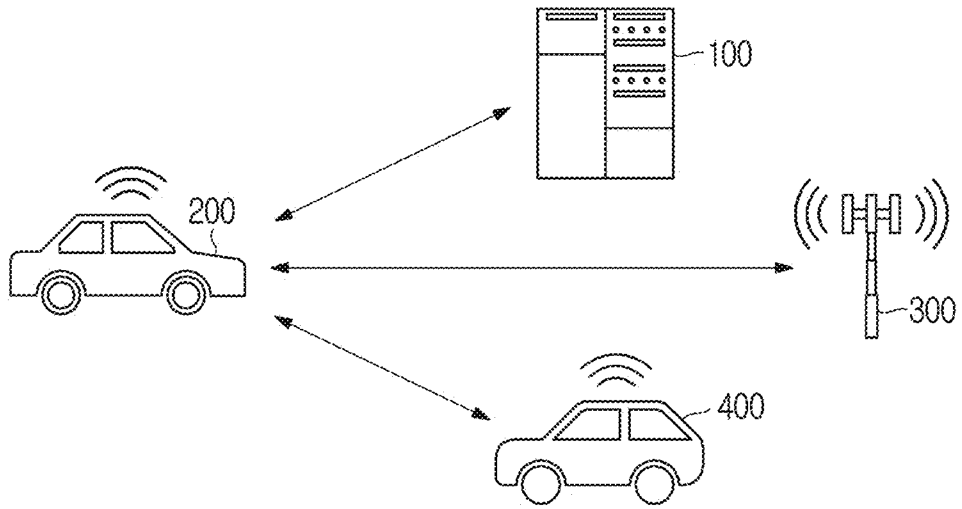
FIG. 6 shows an example of a mobility device communicating with another device to transmit and receive data.

FIG. 6 shows an example of a mobility device communicating with another device to transmit and receive data.

The mobility device 200 may refer to a device that may move to a specific point, as described above in FIG. 1. In the present disclosure, the mobility device 200 is described as a vehicle that runs on the ground, but the present disclosure may also be applied to a mobility device for flying or water transportation. The mobility device 200 may be controlled and driven autonomously, as described above in FIG. 1, and the autonomous driving may be implemented as semi-autonomous driving or fully autonomous driving.

The mobility device 200 may be driven by electric energy or fossil energy. In the case of electric energy, the mobility device 200 may employ, for example, a pure battery-based vehicle driven only by a high-voltage battery or a gas-based fuel cell as an energy source. In addition or alternative, the fuel cell may utilize various forms of gas capable of generating electric energy, and the gas may be, for example, hydrogen. However, the present disclosure is not limited thereto, and various gases may be applied. In the case of fossil energy, the mobility device 200 is driven by fuel such as gasoline, diesel, or liquefied gas, and may be equipped with an engine that drives a wheel drive unit 214 by combustion of the fuel. The engine may be included in a power source unit 212 from the perspective of providing the wheel drive unit 214 with the driving rotational force of the wheels. As another example, the mobility device 200 may also be driven by a hybrid method of electric energy and fossil energy.

Meanwhile, the mobility device 200 may communicate with other devices 100 and 300 or another mobility device 400. The other devices may include, for example, the learning device 100 that supports various controls, status management, and driving of the mobility device 200, the ITS device 300 for receiving information from an Intelligent Transportation System (ITS), various types of user devices, etc. The learning device 100 may be, for example, an external device operated by a vehicle manufacturer or a management agency that provides autonomous driving services, as described above in FIG. 1.

The ITS device 300 is, for example, a road side unit (RSU), and the ITS device 300 may exchange vehicle recognition data, driving control and status data, environmental data around the vehicle, map data, etc. with the mobility device 200 via V2I to assist the user's self-driving or support autonomous driving of the mobility device 200. The mobility device 200 may exchange the data listed above with another mobility device 400 via V2V to support self-driving or autonomous driving.

The mobility device 200 may communicate with other vehicles or other devices based on cellular communication, WAVE (Wireless Access in Vehicular Environment) communication, DSRC (Dedicated Short Range Communication) or short-range communication, or other communication methods.

For example, the mobility device 200 may use a cellular communication network such as LTE or 5G, a Wi-Fi communication network, or a WAVE communication network, for communication with the learning device 100, the ITS device 300, and another mobility device 400. As another example, DSRC or the like used in the mobility device 200 may be used for communication between vehicles. The communication method among the mobility device 200, the learning device 100, the ITS device 300, another mobility device 400, and the user device is not limited to the above-described example.

Figure 7:
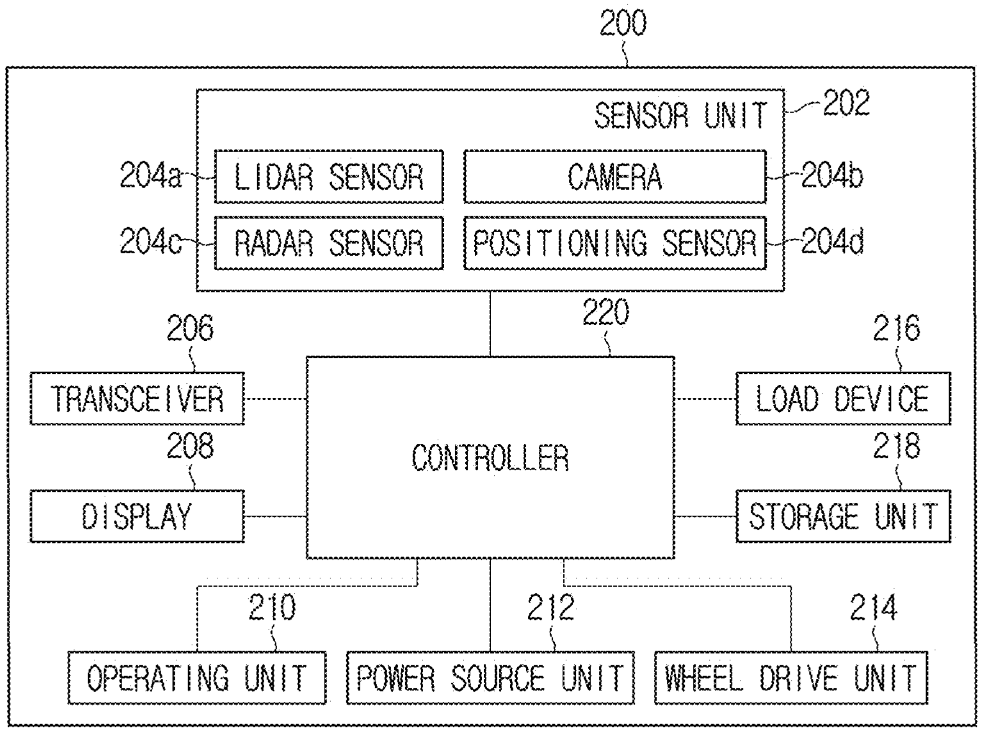
FIG. 7 shows an example of modules constituting a mobility device according to the present disclosure.

FIG. 7 is a schematic diagram showing modules that constitute a mobility device according to the present disclosure. The mobility device 200 of FIG. 7 shows a ground vehicle.

The mobility device 200 may include a sensor unit 202, a transceiver 206, and a display 208.

The sensor unit 202 may be equipped with various types of detectors that detect various states and situations occurring in the external and internal environments of the mobility device 200 and determine the location information of the mobility device 200. That is, the sensor unit 202 is composed of a multi-sensor module including different types of sensors, and may acquire sensing data detected from each sensor.

Specifically, the sensor unit 202 may be equipped with a lidar sensor 204*a*, a camera 204*b* functioning as an image sensor, a radar sensor 204*c* to recognize dynamic and static objects existing around the mobility device 200, and may have a positioning sensor 104*d* to acquire location information of the vehicle. The sensor unit 202 may acquire sensor data including 3D recognition data, perception observation data, and location data by the above-described sensors.

The lidar sensor 204*a* may be a sensor that observes the surrounding environment based on laser scanning and perceives the three-dimensional shape of an object.

The camera 204*b* may acquire images (or image data) having two-dimensional image data or depth information about the surrounding environment and objects of the mobility device 200. The camera 204*b* may be installed in multiple parts of the mobility device 200, so that multiple images or multi-views of the surrounding environment of the mobility device 200 may be acquired.

The radar sensor 204*c* may, for example, irradiate radio waves of a predetermined wavelength to the surroundings and detect the behavior of the object based on the radio waves reflected from the object. The behavior of the object may include, for example, the presence or absence of the object, the movement of the object, a distance between the mobility device 200 and the object, the speed of the object, the direction of movement, etc.

The sensor unit 202 may be equipped with a gyro sensor, an acceleration sensor, a wheel sensor, an odometer, a speed sensor, etc., in addition or alternative to the positioning sensor 104*d*, in order to check its own position, driving posture, and speed. In addition or alternative, the sensor unit 202 may have an inward-facing image sensor, a biometric sensor that detects the biometric signals of the driver and passengers, and various detection modules that detect the operation and status of the internal devices, in order to monitor the status of users and passengers inside the mobility device 200 and the operation status of internal devices that may be operated by the user.

In the present disclosure, the sensors of the sensor unit 202 referred to in the description of the example are mainly described, but sensors that detect various situations not listed therein may be additionally included.

The transceiver 206 may support mutual communication with the learning device 100, the ITS device 300, and the surrounding mobility device 400. In the present disclosure, the transceiver 206 may transmit data generated or stored during driving to the learning device 100, and receive data and software modules transmitted from the learning device 100. In the present disclosure, the mobility device 200 may transmit and receive data utilized in the method according to the present disclosure with the outside through the transceiver 206.

The display 208 may function as a user interface. The display 208 may display the output of the operation status of the mobility device 200, the control status, the route/traffic information, the remaining energy information, the content requested by the driver, etc. by a controller 106. The display

208 is configured as a touchscreen capable of detecting driver input, and may receive the driver's request that instructs the processor 106.

Meanwhile, the mobility device 200 may include an operating unit 210, a power source unit 212, a wheel drive unit 214, and a load device 216.

The operating unit 210 has at least one module that implements a driving operation, and may perform at least one driving operation among longitudinal control such as acceleration/deceleration and lateral control such as steering. The operating unit 210 may have various operating modules for causing the wheel drive unit 214 to generate a driving operation according to the request, including a pedal, a steering wheel, etc. that receive a user's request for the control.

The power source unit 212 may generate and supply power and electric power used for a driving power system such as the wheel drive unit 214 and a load device 114. If the mobility device 200 is driven based on electric energy, the power source unit 212 may be composed of, for example, an electric battery, or a combination of an electric battery and a fuel cell that charges the battery. In the case of a combination of an electric battery and a fuel cell, the power source unit 212 may include a tank that stores a material used to produce electric power of the fuel cell, such as hydrogen gas. If the mobility device 200 is driven based on fossil energy, the power source unit 212 may be composed of an internal combustion engine.

The wheel drive unit 214 may include a plurality of wheels, a driving force transmission module for generating driving force and applying or transmitting the driving force to the wheels, a braking module for decelerating the driving of the wheels, and a steering module for realizing lateral control of the wheels. If the mobility device 200 is driven based on electric energy, the driving force transmission module may be composed of a motor module for generating driving force based on power output from an electric battery. If the mobility device 200 is operated based on fossil energy, the driving force transmission module may be equipped with a transmission or gear module for transmitting power of an internal combustion engine.

In the present disclosure, the operating unit 210 and the wheel drive unit 214 may constitute an actuating unit that transmits power generated from the power source unit 212 to externally implement driving operations and postures, etc. In the present disclosure, the actuating unit is referred to as an actuator, and these terms may be used interchangeably.

The load device 216 is mounted on the mobility device 200 and may be an auxiliary device that consumes electric power supplied from the power source unit 212 or converted from the output of the power source unit 212 by use by a passenger or user. The load device 216 may be a type of non-driving electric device excluding a driving power system such as the wheel drive unit 214 in the present disclosure. The load device 114 may be, for example, an air conditioning system, a lighting system, a seat system, and various devices installed on the mobility device 200.

In addition or alternative, the mobility device 200 may include a storage unit 218 and a controller 220.

The storage unit 218 may store applications and various data for controlling the mobility device 200, and may load applications or read and record data at the request of the controller 220. In the present disclosure, the storage unit 218 may receive and manage the retrained depth network 112 and the trained pose network 114. In addition or alternative, the storage unit 218 may receive and manage information necessary for driving, such as map information, traffic information, weather information, and accident information.

The controller 220 may perform overall control of the mobility device 200. The controller 220 may be configured to execute applications and instructions stored in the storage 218. Specifically, the controller 220 may estimate depth information of the image acquired from the camera **204*b* using the depth network 112 stored in the storage unit 218, and infer detection of an object in the image and occupancy information of the object by other networks used for driving, such as an object detection model and a semantic segmentation model. The controller 220 may control driving based on the estimated or inferred information. In addition or alternative, the controller 220 may perform autonomous driving control based on information estimated from the image, together with various data recognized from the lidar sensor 204*a*, the radar sensor 204*c*, and the positioning sensor 204*d*.**

In the present disclosure, the controller 220 may be implemented as, for example, a single processing module. As another example, the processing according to the above-described matters may be distributed and processed in a plurality of processing modules (e.g., implemented as software, hardware, circuit, circuitry, or application specification integrated circuit (ASIC), etc.), and the controller 220 may be collectively referred to as a plurality of processing modules in the present disclosure.

An object of the present disclosure is to provide a method and device for learning depth estimation based on view synthesis, in order to remove distortion of a synthetic image.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

According to the present disclosure, a method is provided for learning depth estimation based on view synthesis, the method may comprising: training a synthetic image model for generating a synthetic image based on an inference depth output from an original image by a depth network and an inference pose based on the original image; generating a first virtual image based on the synthetic image to be similar to the original image and a second virtual image based on the original image and training a generative adversarial network (GAN) for determining authenticity of the first virtual image and the second virtual image using the original image; and retraining the depth network using the trained generative adversarial network that outputs a determination of the authenticity of the first virtual image generated from the synthetic image.

According to another example of the method of present disclosure, training the generative adversarial network may comprises training the generative adversarial network by freezing synthetic parameters resulting from training of the synthetic image model including parameters learned from the depth network.

According to another example of the method of present disclosure, the generative adversarial network is may trained by utilizing a virtual image loss function and a discriminant loss function, and wherein the virtual image loss function is a loss function for ensuring consistency between the first and second virtual images, and the discriminant loss function is a loss function applied to establish a determination of the authenticity of the first and second virtual images.

According to another example of the method of present disclosure, the generating the first virtual image may comprises generating the first virtual image based on the synthetic image resulting from augmentation of the inference depth.

According to another example of the method of present disclosure, the first virtual image is may generated to correct the distortion of the synthetic image so as to match the original image.

According to another example of the method of present disclosure, the first virtual image and the second virtual image may generate by a generator, and the generator is trained to extract features from the original image and the synthetic image and to generate the first and second virtual images that approximate the original image based on the features.

According to another example of the method of present disclosure, the depth network is may retrained by freezing the parameters of the pose network that outputs the inference pose and the adversarial parameters of the trained generative adversarial network.

According to another example of the method of present disclosure, the depth network is may retrained by using a loss function utilized in the generative adversarial network, wherein the loss function includes a virtual image loss function and a discriminant loss function, and wherein the virtual image loss function is a loss function utilized in the training of the generative adversarial network to ensure consistency between the first and second virtual images, and the discriminant loss function is a loss function applied in the training of the generative adversarial network to establish a determination of the authenticity of the first and second virtual images.

According to another example of the method of present disclosure, the depth network is may retrained by utilizing a contrastive loss function and a discriminant loss function, and wherein the contrastive loss function is a triplet loss function between the synthetic image generated and stored by the trained synthetic image model and the first and second virtual images generated by the trained generative adversarial neural network, and the discriminant loss function is a loss function applied in the training of the generative adversarial neural network to establish a determination of the authenticity of the first and second virtual images.

According to another example of the method of present disclosure, the synthetic image model is may a view synthesis based self-supervised depth estimation model, wherein the original image in the self-supervised depth estimation model includes a source image and a target image that is time-series related to the source image, wherein the inference depth is generated based on the source image, the inference pose is generated based on the source image and the target image, and the synthetic image is output based on the inference depth, the inference pose, and the source image, and wherein the self-supervised depth estimation model is trained using a synthetic loss function for approximating the synthetic image to the target image.

According to another example of the present disclosure, a device is provided for learning depth estimation based on view synthesis, the device comprising: a memory configured to store at least one instruction; and a processor configured to execute the at least one instruction stored in the memory, wherein the processor is configured to: train a synthetic image model for generating a synthetic image based on an inference depth output from an original image by a depth network and an inference pose based on the original image; generate a first virtual image based on the synthetic image to be similar to the original image and a second virtual image based on the original image and train a generative adversarial network (GAN) for determining authenticity of the first virtual image and the second virtual image using the original image; and retrain the depth network using the trained generative adversarial network that outputs a determination of the authenticity of the first virtual image generated from the synthetic image.

The features of the present disclosure, which are briefly summarized above, are only examples of features of the present disclosure and detailed description of the disclosure which follows and are not intended to limit the scope of the present disclosure.

The technical problems solved by the present disclosure are not limited to the above-mentioned technical problems. Other technical problems solved by the present disclosure, which are not described herein should be more clearly understood by a person having ordinary skill in the art of technical field to which the present disclosure belongs, from the following description.

According to the present disclosure, a method and device for learning depth estimation based on view synthesis, may be provided in order to remove distortion of a synthetic image.

It will be appreciated by persons skilled in the art that that the effects that may be achieved through the present disclosure are not limited to what has been particularly described hereinabove and other advantages of the present disclosure will be more clearly understood from the detailed description.

What is claimed is:

1. A method performed by an apparatus for controlling autonomous driving of a vehicle, the method comprising:

training, based on an inference depth and an inference pose, a synthetic image model for generating a synthetic image, wherein the inference depth is outputted by a depth network from an original image, and wherein the inference pose is based on the original image;

generating, based on the synthetic image, a first virtual image to be associated with the original image, wherein a value indicating similarity between the first virtual image and the original image satisfies a threshold value;

generating, based on the original image, a second virtual image;

training a generative adversarial network (GAN) for determining, based on the original image, authenticity of the first virtual image and the second virtual image;

training, based on the trained GAN, the depth network, wherein the trained GAN outputs a determination of the authenticity of the first virtual image;

outputting, based on the trained depth network, a signal; and controlling, based on the signal, autonomous driving of the vehicle.

2. The method of claim 1, wherein the training the GAN comprises training the GAN by freezing synthetic parameters, wherein the synthetic parameters are derived from training of the synthetic image model, and wherein the synthetic image model comprises parameters learned from the depth network.

3. The method of claim 1, wherein the GAN is trained based on a first loss function and a second loss function, wherein the first loss function is a loss function for ensuring consistency between the first virtual image and the second virtual image, and wherein the second loss function is a loss function applied to establish a determination of the authenticity of the first virtual image and the second virtual image.

4. The method of claim 1, wherein the generating the first virtual image comprises generating, based on the synthetic image, the first virtual image, wherein the synthetic image is based on augmentation of the inference depth.

5. The method of claim 1, further comprising:

correcting, based on the first virtual image, a distortion of the synthetic image; and matching, based on the correcting the distortion, the synthetic image to the original image.

6. The method of claim 1, further comprising:

training a generator to:

extract features from the original image and the synthetic image; and generate, based on the extracted features, the first virtual image and the second virtual image, wherein the first virtual image and the second virtual image approximate the original image, and wherein the generating the first virtual image and the second virtual image comprises generating, by the generator, the first virtual image and the second virtual image.

7. The method of claim 1, wherein the training the depth network comprises freezing parameters of a pose network, wherein the pose network outputs the inference pose and adversarial parameters of the trained GAN.

8. The method of claim 1, wherein the training the depth network is based on a loss function utilized in the GAN, wherein the loss function comprises a first loss function and a second loss function, wherein the first loss function is a loss function utilized in the training of the GAN to ensure consistency between the first virtual image and the second virtual image, and wherein the second loss function is a loss function applied in the training of the GAN to establish a determination of the authenticity of the first virtual image and the second virtual image.

9. The method of claim 1, wherein the training the depth network is based on a first loss function and a second loss function, wherein the first loss function is a triplet loss function among the synthetic image and the first virtual image and the second virtual image, wherein the synthetic image is generated and stored by the trained synthetic image model, and wherein the first virtual image and the second virtual image are generated by the trained GAN, and wherein the second loss function is a loss function applied in the training of the GAN to establish a determination of the authenticity of the first virtual image and the second virtual image.

10. The method of claim 1, wherein the synthetic image model is a view synthesis based self-supervised depth estimation model, wherein the original image is in the view synthesis based self-supervised depth estimation model, wherein the original image comprises a source image and a target image that is time-series related to the source image, wherein the inference depth is generated based on the source image, the inference pose is generated based on the source image and the target image, and the synthetic image is outputted based on the inference depth, the inference pose, and the source image, and wherein the view synthesis based self-supervised depth estimation model is trained based on approximating the synthetic image to the target image.

11. An apparatus for controlling autonomous driving of a vehicle, the apparatus comprising:

a processor; and a memory configured to store at least one instruction, that when executed by the processor, is configured to cause the apparatus to:

train, based on an inference depth and an inference pose, a synthetic image model for generating a synthetic image, wherein the inference depth is outputted by a depth network from an original image, and wherein the inference pose is based on the original image;

generate, based on the synthetic image, a first virtual image to be associated with the original image, wherein a value indicating similarity between the first virtual image and the original image satisfies a threshold value; and generate, based on the original image, a second virtual image;

train a generative adversarial network (GAN) for determining, based on the original image, authenticity of the first virtual image and the second virtual image; and train, based on the trained GAN, the depth network, wherein the trained GAN is configured to output a determination of the authenticity of the first virtual image; output, based on the trained depth network, a signal; and control, based on the signal, autonomous driving of the vehicle.

12. The apparatus of claim 11, wherein the at least one instruction, when executed by the processor, is configured to cause the apparatus to train the GAN by freezing synthetic parameters, wherein the synthetic parameters are derived from training of the synthetic image model, and wherein the synthetic image model comprises parameters learned from the depth network.

13. The apparatus of claim 11, wherein the GAN is trained based on a first loss function and a second loss function, wherein the first loss function is a loss function for ensuring consistency between the first virtual image and the second virtual image, and wherein the second loss function is a loss function applied to establish a determination of the authenticity for the first virtual image and the second virtual image.

14. The apparatus of claim 11, wherein the at least one instruction, when executed by the processor, is configured to cause the apparatus to generate, based on the synthetic image, the first virtual image, wherein the synthetic image is based on augmentation of the inference depth.

15. The apparatus of claim 11, wherein the at least one instruction, when executed by the processor, is configured to cause the apparatus to:

correct, based on the first virtual image, a distortion of the synthetic image; and match, based on the distortion corrected, the synthetic image to the original image.

16. The apparatus of claim 11, wherein the first virtual image and the second virtual image are generated by a generator, and wherein the at least one instruction, when executed by the processor, is configured to cause the apparatus to:

train the generator to:

extract features from the original image; and generate, based on the extracted features, the first virtual image and the second virtual image, wherein that the first virtual image and the second virtual image approximate the original image.

17. The apparatus of claim 11, wherein the at least one instruction, when executed by the processor, is configured to cause the apparatus to train the depth network by freezing parameters of a pose network, wherein the pose network is configured to output the inference pose and adversarial parameters of the trained GAN.

18. The apparatus of claim 11, wherein the at least one instruction, when executed by the processor, is configured to cause the apparatus to train, based on a loss function utilized in the GAN, the depth network, wherein the loss function comprises a first loss function and a second loss function, and wherein the first loss function is a loss function utilized in the training of the GAN to ensure consistency between the first virtual image and the second virtual image, and wherein the second loss function is a loss function applied in the training of the GAN to establish a determination of the authenticity of the first virtual image and the second virtual image.

19. The apparatus of claim 11, wherein the at least one instruction, when executed by the processor, is configured to cause the apparatus to train, based on a first loss function and a second loss function, the depth network, wherein the first loss function is a triplet loss function among the synthetic image and the first virtual image and second the virtual image, wherein the second loss function is a loss function applied in the training of the GAN to establish a determination of the authenticity of the first virtual image and the second virtual image.

20. The apparatus of claim 11, wherein the synthetic image model is a view synthesis based self-supervised depth estimation model, wherein the original image is in the view synthesis based self-supervised depth estimation model, wherein the original image comprises a source image and a target image that is time-series related to the source image, wherein the inference depth is generated based on the source image, the inference pose is generated based on the source image and the target image, and the synthetic image is outputted based on the inference depth, the inference pose, and the source image, and wherein the view synthesis based self-supervised depth estimation model is trained based on approximating the synthetic image to the target image.

* * * * *